June 14, 1932.   F. SMITH   1,863,456
AIR FILTER
Filed July 7, 1930
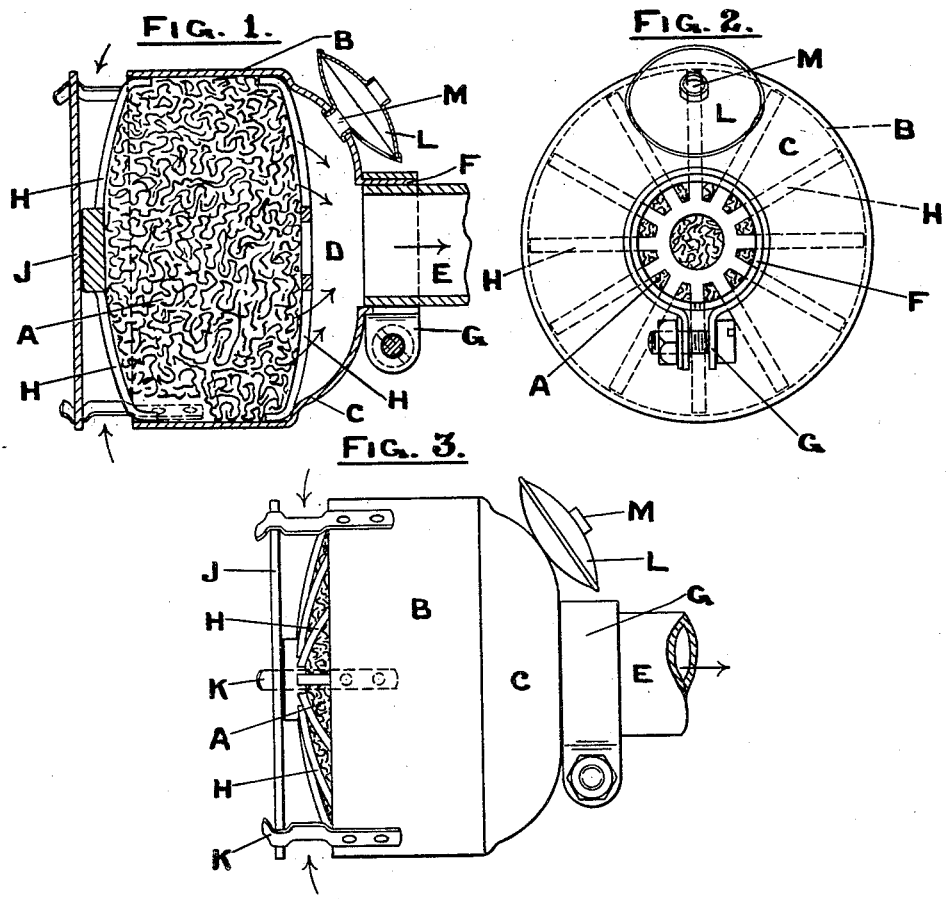

Patented June 14, 1932

1,863,456

UNITED STATES PATENT OFFICE

FRANK SMITH, OF ELLAND, ENGLAND

AIR FILTER

Application filed July 7, 1930, Serial No. 466,301, and in Great Britain February 20, 1930.

The invention relates to air filters of the kind secured to or adapted to serve as an extension of the induction or air inlet pipe of internal-combustion engines, and comprising a vessel or chamber containing a pad or block of entangled wire, metal gauze, or fabric acting as a filtering medium through which the inspired air to be purified is normally accustomed to pass freely without restraint to, for example, the carburetter of said engines, to combine with petrol to form a combustible mixture.

In the use of air filters of this class, the dust, grit or other impurities carried by the passing atmospheric air and intercepted by the filtering medium, accumulates therein tending to partly block or choke the air passages or interstices in said medium, causing a corresponding restriction or impairment of the air supply being drawn through the filter, which, in the case of internal-combustion engines, results in a considerable waste of fuel.

The object of the present invention is an improvement in such filters, by providing an audible or visible signalling device connected to the filter or to the air inlet pipe of a carburetter of internal-combustion engines, or, to the air inlet pipe of air compressors or other apparatus adapted to require a supply of clean air, whereby, on a restriction of the air supply to said engines, air compressors and other apparatus, by the filtering medium as aforesaid, said air supply is restored to the normal and an audible or visible signal, warning or indication given of said restriction or loss in efficiency of the filtering medium.

With reference to the signalling device to be attached to or in communication with the said filter chamber, vessel or the like, it may comprise for example, a wind instrument such as a whistle or the like normally in communication with the aforesaid air chamber and with the engine. Should the air supply to the engine become impeded more or less by the increasing collection of foreign matter in the filtering media, the suction of the engine creates a corresponding vacuum in the air chamber which reacts to replenish said air supply by drawing the necessary amount through the whistle which gives a warning accordingly.

Alternatively, in place of the audible signal, a visible signal may be used, said signal may comprise an electric light bulb mounted on the dashboard of the vehicle and connected with a convenient supply of current. Or, the signal may comprise a lever, pivoted arm, pointer or the like similarly positioned within view of the driver of the vehicle; in each instance the vacuum created in the air chamber as aforesaid is adapted to actuate a spring plunger; in the electric signal the operation of the plunger completes an electric circuit to light the lamp, and in the lever device the plunger is operated to drop the lever, both indicating that the filtering media requires to be cleaned.

As a further alternative, a vacuum gauge may be fitted to the induction pipe, or, on the dashboard or the like and connected by a flexible or other suitable tube to the air chamber of the filter.

I attain these objects by the means illustrated in the accompanying drawing, in which:—

Fig. 1 is a sectional elevation of the improved filter and means whereby an audible warning is given indicating a certain loss in the efficiency thereof.

Fig. 2 is an end view of Fig. 1 from the right thereof.

Fig. 3 is a side elevation of Fig. 1.

Similar letters refer to similar parts throughout the several views.

Referring to Figs. 1, 2 and 3 of the drawing: A is the filtering media within a container or casing B, an extension C of which on the outlet side thereof is curved or bent to form an air chamber D affording the suction of the engine, by way of the pipe E, direct communication with a portion of the opposing area or surface of the filtering media; F is a flange on the outlet from the chamber D, and G is an ordinary spring clip and bolt adapted for securing the filter to the pipe E.

H are preferably dished star plates or grids for holding the media A within the casing B and permitting free access and passage of air through the same; J is a plate secured within spring brackets K attached to the casing B for clamping the grids H and media A together to prevent chattering or the vibration thereof within said casing.

L is the wind instrument preferably a whistle rigidly secured to the extension C, and a vacuum in the chamber D is adapted to draw more or less air through the ports M in the whistle to give a corresponding audible warning or signal, so that on an impairment of the air supply passing through the filtering medium, air will pass through the signaling device to actuate the same, and also to restore the supply of air to the air intake pipe leading to the carbureter or other apparatus to which the filter is applied.

It will be seen that in all of the forms of the invention illustrated that the signaling device is continuous or remains on until the cause of impairment of the air supply is removed.

What I claim as my invention, and desire to secure by Letters Patent, is:—

1. In combination with a filtering device adapted to be connected to an apparatus to supply clean air thereto, of a casing having a filtering pad of entangled wire positioned therein, an air chamber formed between the filtering pad and the outlet of the casing, a signalling device communicating with said chamber and adapted to be actuated upon decrease in pressure in the casing due to impairment of the air supply passing through the filtering pad and to restore the supply of air to the apparatus.

2. In combination with an air intake pipe of an internal combustion engine, a casing connected to said pipe, a filter pad of entangled wire positioned in said casing, a perforated plate separating said filter pad from the outlet of the casing to form a chamber therebetween, a signalling device communicating with said chamber whereby on impairment of the air supply passing through the filtering pad, air passes through the signaling device to actuate the same and to restore the supply of air to said intake pipe.

3. In combination with an air intake pipe of an internal combustion engine, a casing connected to said pipe, a plate having an opening positioned in said casing to provide spaced intercommunicating chambers, a filter pad of entangled wire in one of said chambers and through which the impure air passes and is treated prior to its admission into the engine, and a signalling device communicating with the other of said chambers, whereby upon decrease in pressure in the casing due to impairment of the air supply passing through the filtering pad, air passing through the signaling device actuates the same and restores the supply of air to said intake pipe.

4. In combination, an air filter having a casing connected to the apparatus to be supplied with clean air, said casing having a perforated plate dividing the same into a filter chamber and air chamber, a filter pad of entangled wire in said filter chamber for treating the air prior to its admission to the apparatus and a signalling device connected to said air chamber whereby upon the reduction of the air supply through the filter chamber to cause the actuation of the signalling device and the restoring of the air into the apparatus.

5. In combination with a filtering device adapted to be connected to an apparatus to supply fresh air thereto, of a casing having a filtering media therein, and a signaling device communicating with said casing whereby upon decrease in pressure in the casing due to impairment of the air supply passing through the filtering media, air passes through the signaling device to actuate the same and to restore the supply of air to the apparatus.

In testimony whereof I affix my signature.

FRANK SMITH.